(12) United States Patent
Sahasrabudhe et al.

(10) Patent No.: US 8,392,037 B2
(45) Date of Patent: Mar. 5, 2013

(54) STABILIZED APPROACH TO A POINT IN DEGRADED VISUAL ENVIRONMENT

(75) Inventors: Vineet Sahasrabudhe, Handen, CT (US); Lorren Stiles, Pam City, FL (US); Margaret A. Macisaac, Woodbury, CT (US); John H. Judge, Woodbury, CT (US); Alex Faynberg, Cheshire, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 371 days.

(21) Appl. No.: 12/671,736

(22) PCT Filed: Aug. 18, 2008

(86) PCT No.: PCT/US2008/073417
§ 371 (c)(1),
(2), (4) Date: Feb. 2, 2010

(87) PCT Pub. No.: WO2009/042309
PCT Pub. Date: Apr. 2, 2009

(65) Prior Publication Data
US 2011/0137492 A1 Jun. 9, 2011

Related U.S. Application Data

(60) Provisional application No. 60/956,419, filed on Aug. 17, 2007.

(51) Int. Cl.
*B64D 43/02* (2006.01)
*G06F 19/00* (2006.01)

(52) U.S. Cl. ............ 701/3; 701/10; 701/16; 244/17.13

(58) Field of Classification Search .............. 701/1, 3–5, 701/10, 11, 12, 14, 16–18; 244/17.11, 75.1, 244/17.13, 76 R, 81, 175, 183–188; 340/945, 340/971, 972, 980; 348/113, 115, 117
See application file for complete search history.

(56) References Cited

U.S. PATENT DOCUMENTS

| 3,927,306 | A | * | 12/1975 | Miller | 701/15 |
| 3,934,250 | A | * | 1/1976 | Martin, Jr. | 342/42 |
| 4,029,271 | A | * | 6/1977 | Murphy et al. | 244/17.13 |
| 4,551,804 | A | * | 11/1985 | Clark et al. | 701/3 |
| 4,603,389 | A | * | 7/1986 | Griffith et al. | 701/7 |
| 4,801,110 | A | * | 1/1989 | Skutecki | 244/17.13 |
| 4,863,120 | A | | 9/1989 | Zweifel et al. | |
| 5,593,114 | A | | 1/1997 | Ruhl | |
| 5,797,564 | A | * | 8/1998 | Cartmell et al. | 244/223 |
| 5,838,262 | A | * | 11/1998 | Kershner et al. | 340/945 |
| 6,057,786 | A | * | 5/2000 | Briffe et al. | 340/975 |
| 6,216,065 | B1 | * | 4/2001 | Hall et al. | 701/16 |
| 6,255,965 | B1 | * | 7/2001 | D'Orso | 340/946 |

(Continued)

OTHER PUBLICATIONS

Steven Aftergood and John Pikes, Digital Terrain Elevation Data [DTED], Intelligence Resource Program, pp. 1 and 2, http:/www.fas.org/irp/program/core/dted.htm, Jan. 2000.

(Continued)

*Primary Examiner* — Tan Q Nguyen
(74) *Attorney, Agent, or Firm* — Carlson, Gaskey & Olds PC

(57) ABSTRACT

A flight control system includes a fly by wire system operable to provide predictive termination point symbology overlaid on a synthetic imagery displayed by a display system in response to a control system and a sensor system. A method to facilitate a VTOL aircraft approach to a terminal point includes integrating a flight director mode with a control system to provide a stabilized approach path to a termination point.

19 Claims, 6 Drawing Sheets

U.S. PATENT DOCUMENTS

| | | | |
|---|---|---|---|
| 6,629,023 B1 * | 9/2003 | Silder et al. | 701/16 |
| 6,678,588 B2 * | 1/2004 | He | 701/3 |
| 6,711,479 B1 * | 3/2004 | Staggs | 701/16 |
| 6,798,423 B2 * | 9/2004 | Wilkins et al. | 345/618 |
| 6,862,501 B2 * | 3/2005 | He | 701/3 |
| 6,879,886 B2 * | 4/2005 | Wilkins et al. | 701/3 |
| 6,972,696 B2 * | 12/2005 | Rogers et al. | 340/971 |
| 7,010,398 B2 * | 3/2006 | Wilkins et al. | 701/3 |
| 7,091,881 B2 | 8/2006 | Judge et al. | |
| 7,106,217 B2 | 9/2006 | Judge et al. | |
| 7,365,652 B2 * | 4/2008 | Scherbarth | 340/974 |
| 7,642,929 B1 * | 1/2010 | Pinkus et al. | 340/973 |
| 7,672,758 B2 * | 3/2010 | Astruc | 701/16 |
| 7,692,571 B2 * | 4/2010 | Lovberg et al. | 342/52 |
| 7,898,435 B2 * | 3/2011 | Rogers et al. | 340/973 |
| 8,019,490 B2 * | 9/2011 | Ferren et al. | 701/3 |
| 2004/0225420 A1 | 11/2004 | Morizet et al. | |
| 2010/0156758 A1 * | 6/2010 | Anders | 345/8 |

OTHER PUBLICATIONS

CIS: DEM Comparisons, pp. 1-6, http:/members.shaw.ca/davepatton/demcompare.html.

Pablo's Mission Planning Website http:/www.mission-planning.com/DTED_Part1.htm.

DTED from Wikipedia http:/en.wikipedia.org/wiki/DTED, Aug. 2008.

Search Report and Written Opinion mailed on Aug. 10, 2009 for PCT/US2008/073417.

* cited by examiner

STABILIZED APPROACH TO A POINT IN DEGRADED VISUAL ENVIRONMENT

BACKGROUND

The present disclosure claims priority to U.S. Provisional Patent Application Ser. No. 60/956,419, filed Aug. 17, 2007.

The present disclosure relates to aircraft operations in a degraded visual environment.

Rotary wing aircraft are routinely required to approach and land at remote sites without external navigational guidance or acceptable visual conditions. Often the topography, ground hazards, mobile obstacles, stationary objects and weather in the area are unknown or changing. Upon arrival at the remote site, the pilot must typically make critical judgments based on incomplete or inaccurate data in order to determine the proper procedure to approach and land. If the terrain condition is such that dust, snow, sand, or the like will be stirred by rotor downwash, the rotary wing aircraft may become engulfed in a cloud of visually-restrictive material. This is commonly referred to as a degraded visual environment (DVE) or a "brownout/whiteout."

Research including literature reviews, pilot interviews, and military incident reports indicate that incidents due to DVE conditions often occur because the pilot becomes spatially disoriented due to loss of visual references. During approach to hover and landing, the pilot manipulates the aircraft controls to conduct a constant deceleration of ground velocity while coordinating a rate of descent to the ground in such a way as to arrive at the ground with little or no forward velocity and a low rate of descent. In addition to controlling a rate of descent, the pilot must also compensate for forward, aft, lateral, and heading drift.

The approach to landing in DVE conditions is visually intensive. In a DVE approach where the outside environment is obscured, the pilot's ability to visually establish the approach profile and maintain stable flight is dramatically affected.

Although rotary wing aircraft are effectively operated in DVE conditions, systems for enhanced DVE operations are desired.

SUMMARY

An aircraft system according to an exemplary aspect of the present application includes a flight control system operable to provide predictive termination point symbology overlaid on a synthetic imagery displayed by a display system in response to a control system and a sensor system.

A method to facilitate a VTOL aircraft approach to a terminal point according to an exemplary aspect of the present application includes integrating a flight director mode with a control system to provide a stabilized approach path to a termination point.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
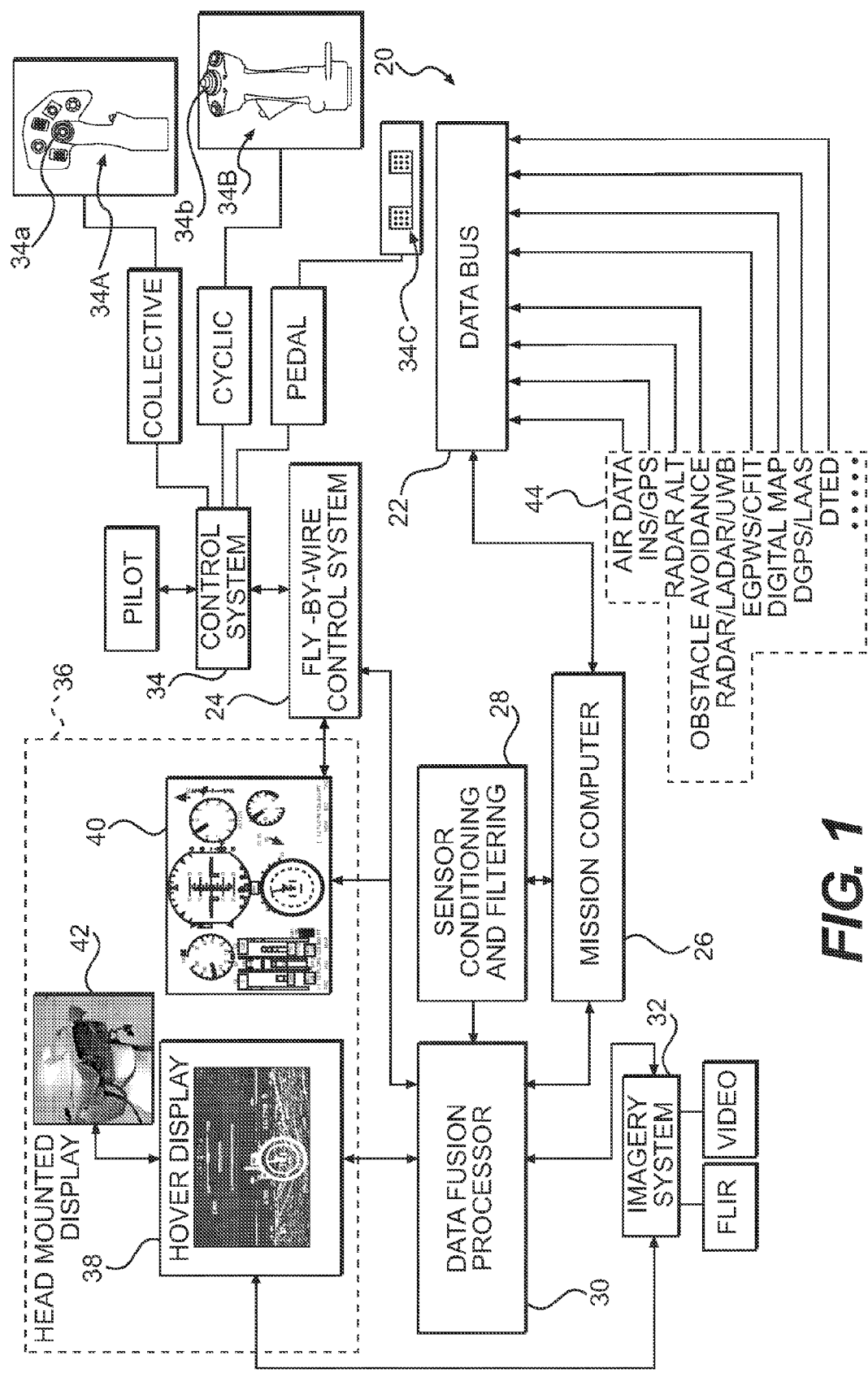
FIG. 1 is a schematic block diagram of a system architecture.

FIG. 1 schematically illustrates a general system architecture block diagram view of an aircraft system 20 which facilitates operations in a degraded visual environment (DVE). The system 20 includes a plurality of interconnected systems to facilitate operation of a rotary wing, vertical take off and landing (VTOL), aircraft. Although a particular helicopter configuration may be described in the disclosed embodiment, other configurations and/or machines, such as high speed compound rotary-wing aircraft with supplemental translational thrust systems, dual contra-rotating, coaxial rotor system aircraft, turbo-props, tilt-rotors and tilt-wing aircraft, will also benefit from the present invention.

The system 20 generally includes a data bus 22, a flight control system 24, a mission computer 26, a sensor conditioning and filtering system 28, a data fusion processor 30, an imagery system 32, a control system 34, and a sensor system 44. The flight control system 24 receives data from the data bus 22, the mission computer 26, the data fusion processor 30 and the control system 34.

The data bus 22 receives inputs from the sensor system 44. The sensor system 44 may include a variety of systems which survey the environment and provide data to augment the pilot's visual cues. The sensor system 44 may include, but not be limited to, a radar altimeter, air data system, inertial navigation systems, traffic alert and collision avoidance system, Enhanced Ground Proximity Warning System (EGPWS)/Controlled Flight Into Terrain (CFIT), digital map, terrain database, Digital Terrain Elevation Data (DTED®), global positioning system, Differential Global Positioning System (DGPS), microwave radar, 35 GHz wave scanning beam radar as well as others. The National Imagery and Mapping Agency (NIMA) has developed standard digital datasets such as (DTED®) which is a uniform matrix of terrain elevation values which provides basic quantitative data for systems and applications that require terrain elevation, slope, and/or surface roughness data. The data from the sensor system 44 is communicated to the data fusion processor 30 over the data bus 22 for presentation to the pilot in the form of synthetic imagery which may or may not overlay the outside scene, and/or symbology.

The imagery system 32 may include a variety of systems which survey the environment and provide data to augment the pilot's visual cues. The imagery system 32 may include a variety of imagery collectors such as a forward looking infrared (FLIR) system and a daylight video camera system. The data from the imagery system 32 is communicated to the data fusion processor 30 over the data bus 22 for presentation to the pilot in the form of synthetic imagery which may or may not overlay the outside scene, and/or symbology.

The mission computer 26 communicates with the sensor system 44 through the data bus 22 to provide flight data, including velocity, height above ground, groundspeed, ground track, wind direction, wind speed, location of a landing zone, location of other aircraft in the formation, aircraft performance, etc. This data is generally data that cannot normally be gathered by purely visual attentiveness during approach and landing, especially in DVE conditions. The mission computer 26 may also communicate with various other systems and subsystems which may include, for example, the flight control systems, weapons systems, air data computers, engine systems, sensor systems, collision and avoidance systems, as well as other types of systems currently installed or planned for future aircraft applications.

The sensor conditioning and filtering system 28 filters data obtained from the data bus 22 to extract particular data signals. The mission computer 26 and the sensor conditioning and filtering system 28 provides data to the data fusion processor 30, which analyzes and compiles the data into a combined output or synthetic imagery. That is, the data fusion processor 30 fuses together the wide variety of data available and converts the data into a symbology format for display through a display system 36. For example, the data fusion processor 30 may combine: (1) the imagery data from the FLIR camera; (2) visual data from the camera system; (3) environmental data collected by the sensor system 44; and (4) positional data generated by the mission computer 26 into synthetic imagery for display by the display system 36. The data fusion processor 30 may also fuse together the sensor data and terrain database data to depict essentially three-dimensional synthetic imagery which represents terrain and obstructions from the pilot's perspective that may not even be visible under DVE conditions.

The data fusion processor 30 communicates data to the display system 36 which may include a hover display 38, a primary flight display 40, and a helmet mounted display (HMD) 42 to generate appropriate symbology from the fused data. The fused data presented on the HMD 42 is stabilized in conformity to overlay the outside scene through the utilization of a head-tracking device to generate a field of view with visually coupled data to augment the natural out-the-window view. The HMD 42 also permits the pilot to cue on-board systems to points of interest the pilot is viewing in the outside scene. The HMD 42 may be augmented by other panel-mounted displays such as a heads down display (HDD) and a heads up display (HUD) of the display system.

The display system 36 includes precise pilotage symbology to facilitate approach, hover and landing/take-off in DVE conditions. For example, the display system 36 may include a representative three-dimensional terrain view, a top down view, a planned landing area, aircraft location relative to the planned landing area, and aircraft parameters such as aircraft velocity, altitude, heading, rate of descent, etc. The display system 36 may also provide data fused symbology to display mobile objects detected by the sensor system 44 and imagery system 32. The synthetic imagery reduces pilot workload through assimilation of data from multiple systems.

Figure 2:
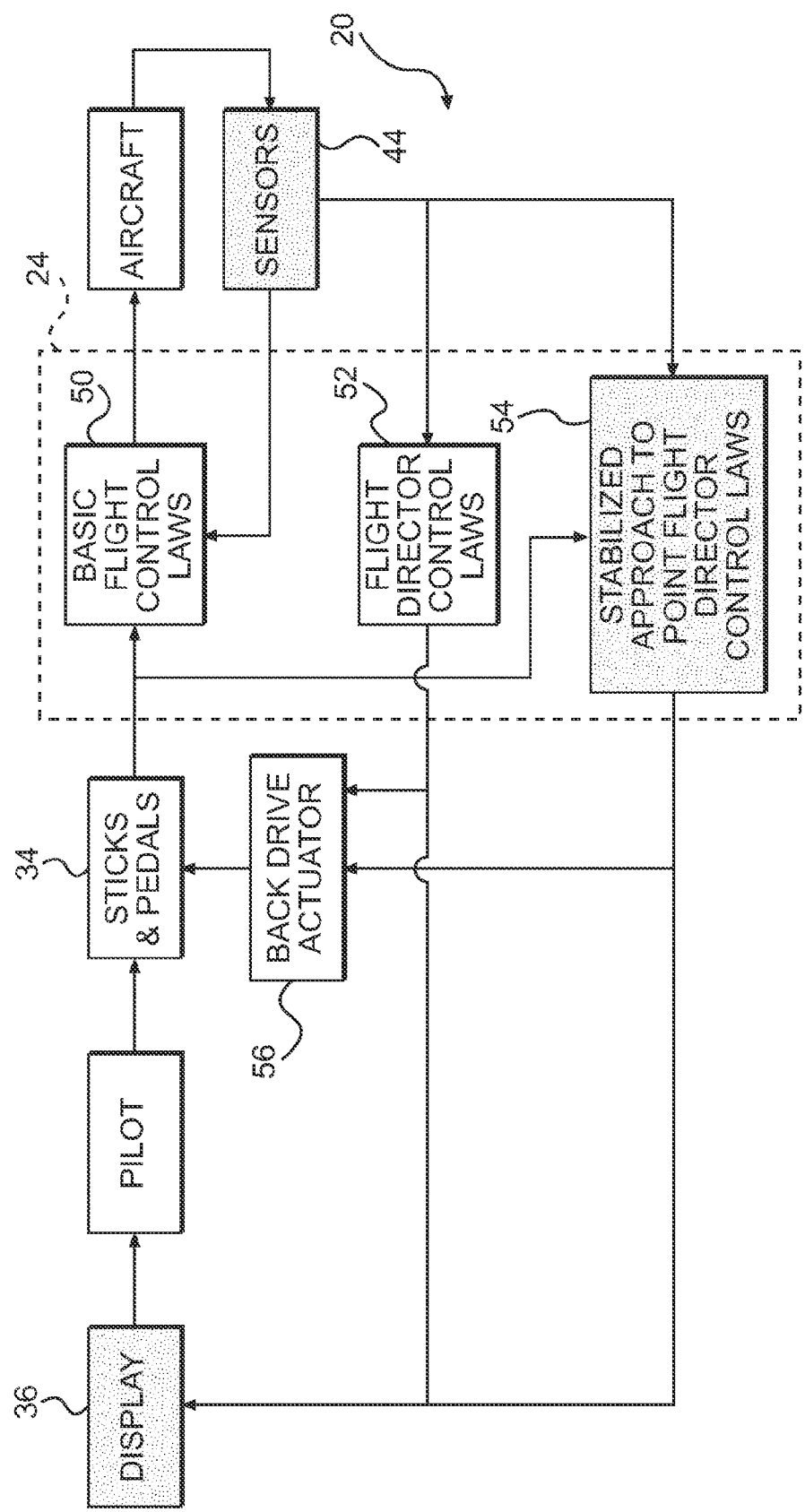
FIG. 2 is a schematic block diagram of a flight control system with a stabilized approach to point flight director control law module and a backdrive actuator system.

Referring to FIG. 2, the flight control system 24 generally includes a basic flight control law module 50, a flight director control law module 52 a stabilized approach to point flight director control law module 54. It should be understood that the term "module" as utilized herein may be dedicated or multi-functional hardware or software within the flight control system 24.

It should be understood that various flight control systems such as Fly-By-Wire (FBW) as well as partial authority flight control systems may be utilized herewith. Response types such as Attitude Command Velocity Hold, Translational Rate Command, and Hover Hold functionality are typically available for aircraft with full authority FBW systems. Rate Command and limited envelope Attitude Command Attitude Hold functionality are typically available for aircraft with partial authority flight control systems.

The basic flight control law module 50 receives pilot inputs from the control system 34. The control system 34 operate as an interface between the pilot and the flight control system 24 and may include, but not be limited to, a collective inceptor controller 34A, a cyclic inceptor controller 34B, a collective beeper 34a, a cyclic beeper 34b, and a pedal system 34C (FIG. 1). The collective beeper 34a, and the cyclic beeper 34b are multi-directional control switches typically located on the on the grip of the respective collective inceptor controller 34A and cyclic inceptor controller 34B flight control. It should be understood that various controls may alternatively or additionally be utilized including for example, a touch screen.

The flight director control law module 52 includes autopilot response type control logic which enables a pilot to automatically, for example, command a stabilized flight path, and hold hover position from a preprogrammed menu of autopilot options. The flight director control law module 52 may be utilized with either a coupled mode in which the approach is "hands off" or uncoupled mode in which the pilot manually responds to control commands displayed on the display system 36 (FIG. 1). In a coupled mode, the flight director control law module 52 drives a backdrive actuator system 56 to backdrive the control system 34 during hands-off autopilot of the aircraft. Typically, pilot commands to the collective inceptor controller 34A or the cyclic inceptor controller 34B in the coupled mode during an autopilot response type, will cancel the autopilot response type. In an un-coupled mode, the flight director control law module 52 provides flight command cues on the display system 36. The pilot then nulls out the flight command cues through control system 34 command to provide closed loop control of the aircraft.

The stabilized approach to point flight director control law module 54 provides an integrated Stabilized Approach to Point (SAP) mode. The Stabilized Approach to Point (SAP) mode includes a pilot-selectable coupled flight director and highly augmented response which are seamlessly integrated with the display system to provide a fully integrated approach which minimizes pilot workload and enables accurate landing at the terminal point under DVE conditions. The Stabilized Approach to Point (SAP) mode may be integrated with the more stable inner response types such as Attitude Command Velocity Hold to refine handling qualities at the terminal point. In order to facilitate safe maneuvers when hovering close to the ground, the highly augmented response type is available to the pilot through the inner loops, and integrated with the flight director control law module 52 to provide the complete Stabilized Approach to Point (SAP) mode.

The synthetic imagery and symbology on the display system 36 mechanizes the automatic approach to the terminal point. An automatic coupled approach is achieved "hands-off" yet allows the pilot to modulate vertical flight path via the collective beeper 34a speed via pitch with the cyclic beeper 34b, and lateral ground track via roll with the cyclic beeper 34b.

In response to beeper inputs to the collective beeper 34a and/or the cyclic beeper 34b once the Stabilized Approach to Point (SAP) mode has been initiated, the terminal point and the path to the terminal point is recomputed by the stabilized approach to point flight director control law module 54 then depicted as representative symbology of the terminal point on the synthetic imagery of the display system 36. That is, the stabilized approach to point flight director control law module 54 continuously calculates the terminal point and the path thereto based on current aircraft states and pilot commands such as beeper inputs to the collective beeper 34a and/or the cyclic beeper 34b, which are input directly to the stabilized approach to point flight director control law module 54. In other words, beeper inputs to the collective beeper 34a and/or the cyclic beeper 34b reposition the representative symbology of the terminal point on the synthetic imagery even after the Stabilized Approach to Point (SAP) mode has been initiated to adjust the stabilized approach path to provide the repositioned terminal point.

The Stabilized Approach to Point (SAP) mode may include a vertical rate function to hover hold that permits a controlled descent to the ground with zero lateral and longitudinal drift. The Stabilized Approach to Point (SAP) mode may terminate relatively close to the ground, for example, less than 10 ft above the ground. The Stabilized Approach to Point (SAP) mode provides a seamless transition to a hover position hold from a high flare terminating the approach at the termination point. A vertical descent to landing may then be commanded through a collective down command, given that the terminal point of the approach is planned to be close to the ground.

Figure 3:
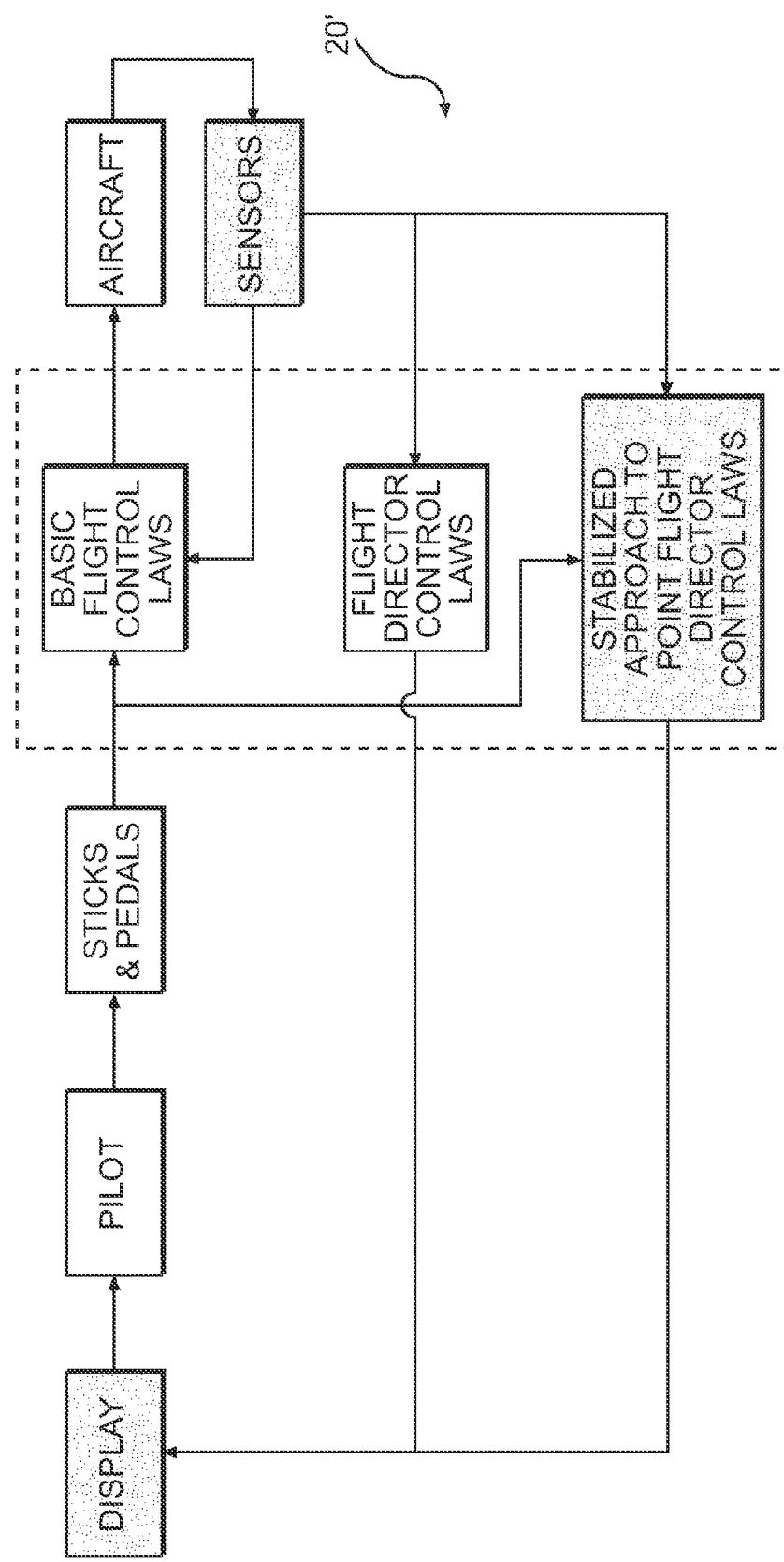
FIG. 3 is a schematic block diagram of a flight control system with a stabilized approach to point flight director control law module without a backdrive actuator system.

The stabilized approach to point flight director control law module 54 will automatically guide the aircraft to the terminal point, when stick backdrive is available. When stick backdrive is not available in the aircraft system 20' (FIG. 3) the stabilized approach to point flight director control law module 54 provides command cues on the display system 36. The pilot then nulls out the command cues by inputting commands to the control system 34 to provide closed loop control of the aircraft. With more sophisticated inner loops in the basic flight control law module 50, as discussed earlier, the pilot will more readily close the control loops manually through the un-coupled flight director.

The requirement for external visual environment is reduced through the flight control augmentation with the stabilized approach to point flight director control law module 54 and the display system 36 which provides predictive symbology overlaid on the synthetic imagery. This synthetic imagery is driven by the data fusion processor 30 which, for example, combines the 3D radar or other sensor and a priori terrain database such as the Digital Terrain Elevation Data (DTED®). The pilot's workload is reduced by integration of flight symbology with the terrain database to provide the synthetic imagery which simulates a perspective representation of the environment with an adequate field of view for landing.

The symbology depicts aircraft state and the projected terminal point location to thereby allow the pilot to adjust the terminal point as the aircraft approaches the ground and obstacles—both terrain and mobile—which become apparent in the synthetic imagery. Thus, the perspective representation of the environment with the synthetic imagery provides visual flow cues integrated with predictive flight path symbology to enable pilot control of the flight path to an obstacle-free terminal point even in a DVE condition.

Figure 4:
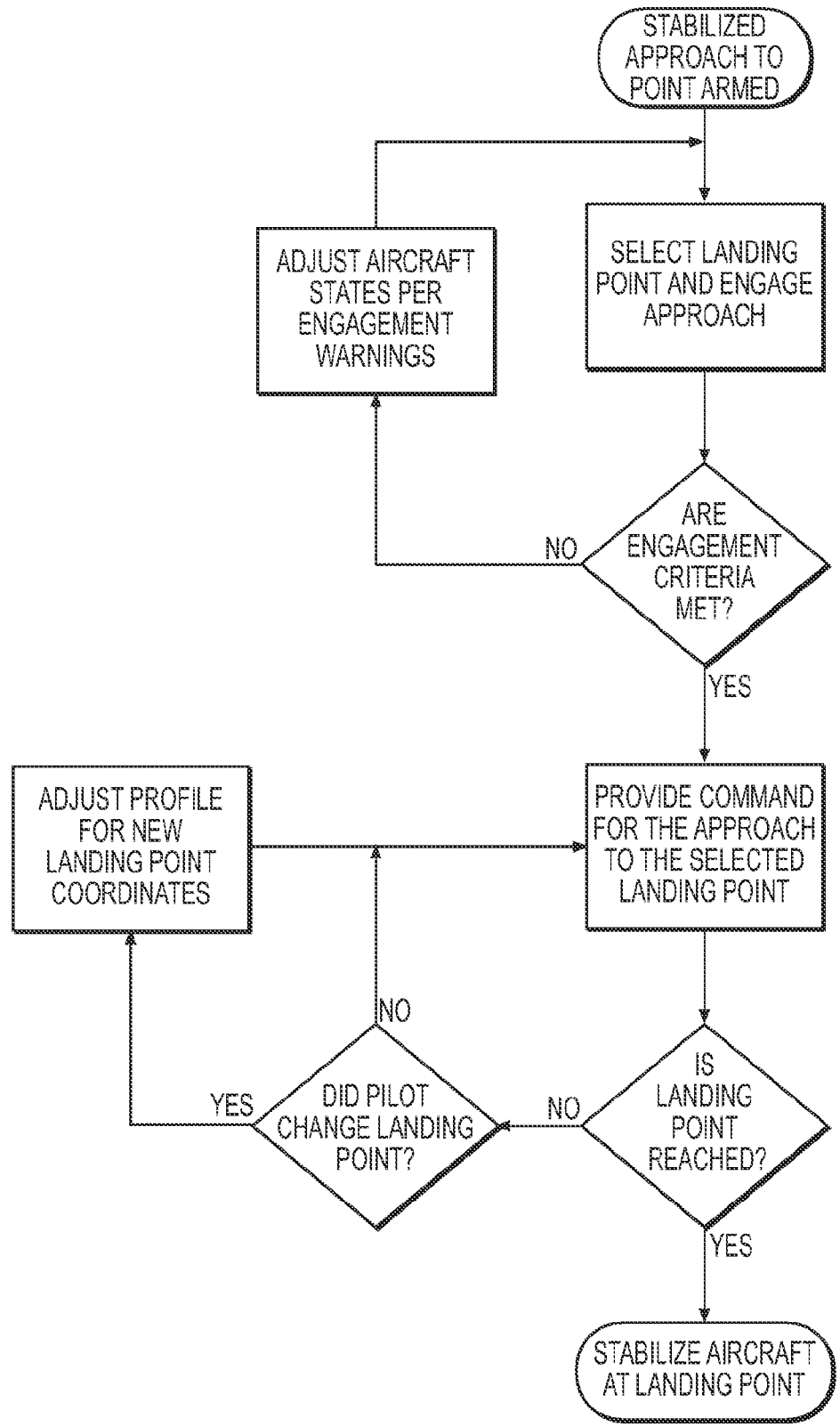
FIG. 4 is a flowchart illustrating operation of a Stabilized Approach to Point (SAP) mode of the stabilized approach to point flight director control law module.
Figure 5:
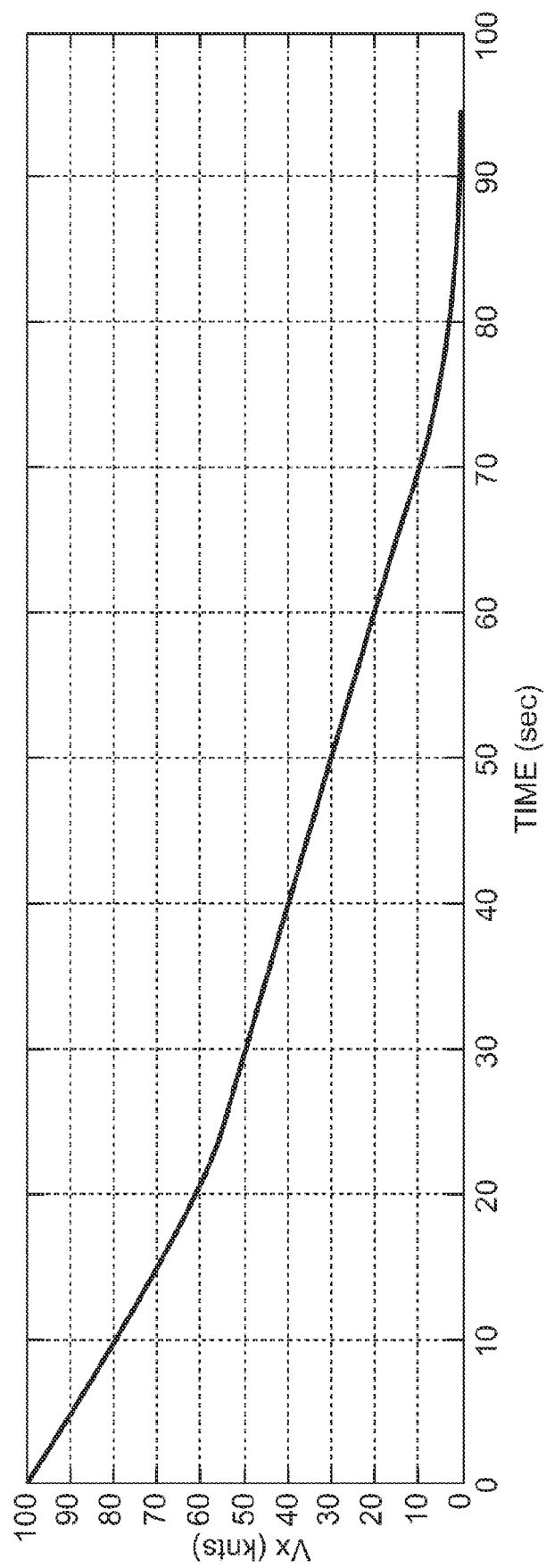
FIG. 5 is a schematic view of a nominal stabilized approach velocity profile to a terminal point generated by the stabilized approach to point flight director control law module.

In operation and with reference to FIG. 4, the stabilized approach to point flight director control law module 54 reduces pilot workload while maneuvering during the stabilized approach path and facilitates repositioning of the terminal point to change the planned approach. Consider a nominal version of the stabilized approach path to hover at the terminal point illustrated in FIG. 5. Once Stabilized Approach to Point (SAP) mode has been initiated, the stabilized approach to point flight director control law module 54 will fly the aircraft to the nominal terminal point along a stabilized approach path. In one non-limiting embodiment, the stabilized approach path may have a deceleration profile which includes a 2 knts/sec deceleration above 70 knts; a transition period between 70 to 55 knts; a 1 knts/sec deceleration between 55 knts to 10 knts; a deceleration decay from 10 knts to hover; and a vertical profile initial stage flight path angle which does not exceed 8.5 degrees. It should be understood that other stabilized approach path deceleration profiles may alternatively or additionally be provided including pilot selection of tailored stabilized approach paths such as an aggressive tactical approach path to hover at the terminal point, or a nominal stabilized approach path to hover at the terminal point.

Figure 6:
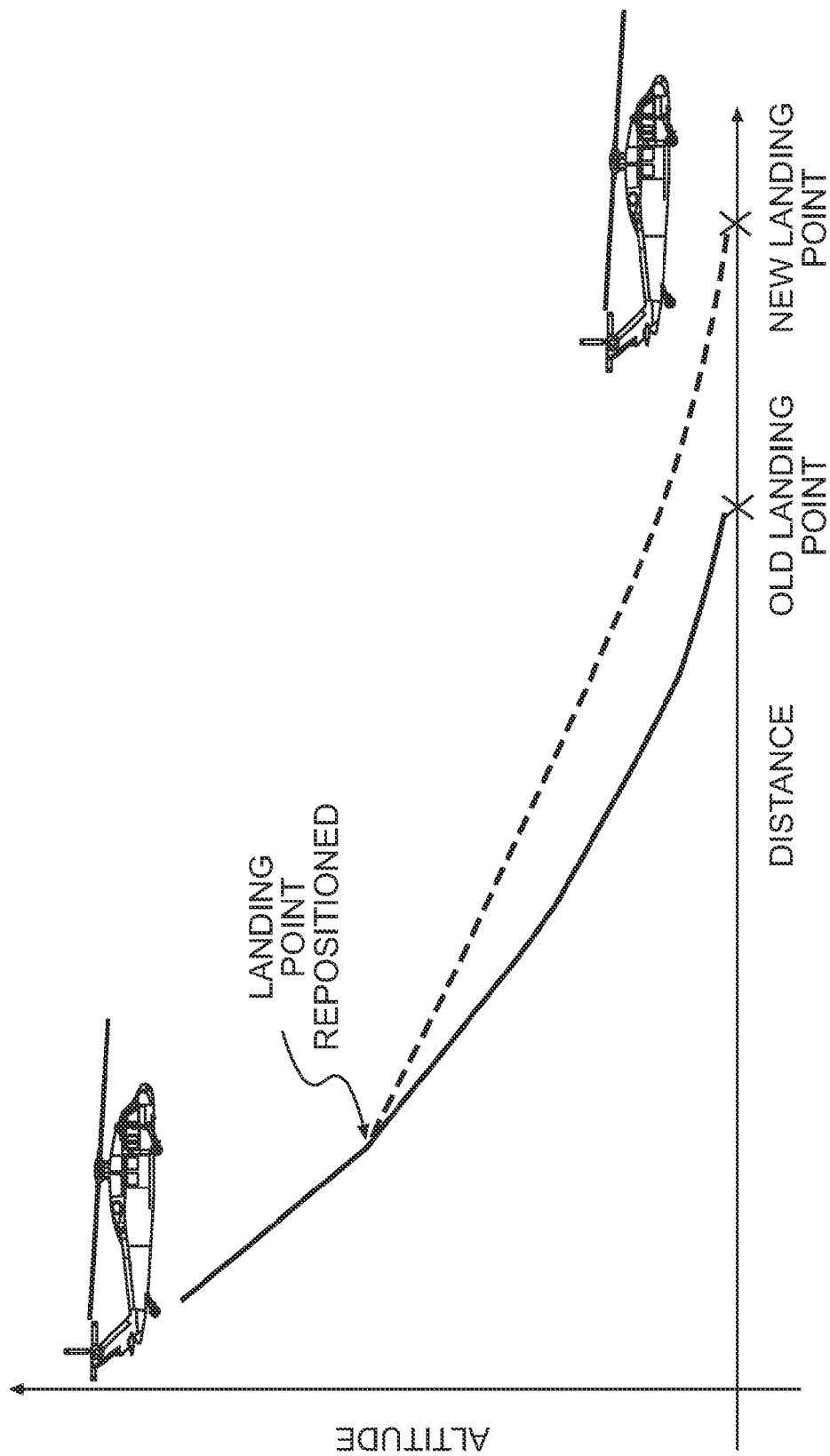
FIG. 6 is a schematic view of a stabilized approach path to a terminal point in which beeper input command adjust the terminal point after initiation of the Stabilized Approach to Point (SAP) mode.

If the sensor system 44 and/or imagery system 32 detects, for example, a mobile object, e.g., vehicle or stationary object, e.g., power lines which would not be found in an onboard database of know environments such as that provided in a terrain database, symbology representative of the object is displayed on the display system 36. Notably, the fused information may include the wide variety of data from the sensor system 44 which may be represented as symbology for fusion into the synthetic imagery which is generated from the terrain database, radar and/or other sensors in the sensor system 44. Should the object conflict with the terminal point, the pilot may adjust the symbology representative of the terminal point on the display system 36 with appropriate beeper inputs to the collective beeper 34a and/or the cyclic beeper 34b which changes the stabilized approach path to hover (FIG. 6). Notably, the stabilized approach path to hover may be adjusted in any direction such as fore, aft, port, starboard by the collective beeper 34a and/or the cyclic beeper 34b. The stabilized approach path is being continuously recomputed by the stabilized approach to point flight director control law module 54 such that the symbology representative of the terminal point shifts to indicate the adjusted terminal point on the synthetic imagery provided by the display system 36.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed is:

1. An aircraft system comprising:
   a display system;
   a control system;
   a sensor system; and
   a flight control system operable to provide predictive termination point symbology overlaid on a synthetic imagery displayed by said display system, the predictive termination point symbology configured to adjust in response to said control system and said sensor system.

2. The system as recited in claim 1, wherein said control system includes a cyclic inceptor controller.

3. The system as recited in claim 2, wherein said control system includes a collective inceptor controller.

4. The system as recited in claim 1, wherein said sensor system includes terrain data.

5. The system as recited in claim 4, wherein said terrain data includes Digital Terrain Elevation Data.

6. The system as recited in claim 4, wherein said synthetic imagery includes a perspective representation in response to the Digital Terrain Elevation Data.

7. The system as recited in claim 1, wherein said flight control system includes a fly by wire flight control system with a stabilized approach to point flight director control law module.

8. The system as recited in claim 7, wherein said stabilized approach to point flight director control law module receives inputs from said control system to adjust said predictive termination point symbology relative said synthetic imagery.

9. The system as recited in claim 7, wherein said stabilized approach to point flight director control law module receives inputs from said sensor system to adjust said predictive termination point symbology relative said synthetic imagery.

10. The system as recited in claim 1, further comprising a backdrive actuator system operable to backdrive said control system in response to said flight control system.

11. A method to facilitate a VTOL aircraft approach to a terminal point comprising:
   initiating a flight director mode;
   integrating the flight director mode with a control system to provide a stabilized approach path to a termination point; and
   changing the termination point in response to control inputs.

12. A method as recited in claim 11, wherein the termination point is within 10 feet of the ground.

13. A method as recited in claim 11, further comprising:
   positioning symbology representative of the termination point on a synthetic imagery after initiating the flight director mode.

14. A method as recited in claim 13, further comprising:
   positioning the symbology representative of the termination point with respect to symbology representative of a mobile object detected by at least one sensor and displayed on the synthetic imagery.

15. A method as recited in claim 11, further comprising:
   continuously calculating the termination point.

16. A method as recited in claim 15, further comprising:
   biasing the stabilized approach path after initiation of the flight director mode to change the termination point in response to current aircraft states and control inputs.

17. A method as recited in claim 16, further comprising:
   changing the termination point in response to control inputs.

18. A method as recited in claim 11, further comprising:
   coupling the stabilized approach path to the termination point; and
   backdriving the control inputs.

19. A method as recited in claim 11, further comprising:
   decoupling the stabilized approach path to the termination point; and
   displaying the control inputs to provide the stabilized approach path to the termination point.

* * * * *